(12) United States Patent
Fleck et al.

(10) Patent No.: US 9,782,042 B2
(45) Date of Patent: Oct. 10, 2017

(54) BENDABLE MAT

(71) Applicants: John Fleck, Cave Creek, AZ (US);
Adam J Fleck, Tempe, AZ (US)

(72) Inventors: John Fleck, Cave Creek, AZ (US);
Adam J Fleck, Tempe, AZ (US)

(*) Notice: Subject to any disclaimer, the term of this patent is extended or adjusted under 35 U.S.C. 154(b) by 0 days.

(21) Appl. No.: 14/120,483

(22) Filed: May 21, 2014

(65) Prior Publication Data
US 2017/0196406 A1 Jul. 13, 2017

(51) Int. Cl.
*A47J 47/00* (2006.01)
*B67C 11/02* (2006.01)

(52) U.S. Cl.
CPC ............ *A47J 47/005* (2013.01); *B67C 11/02* (2013.01)

(58) Field of Classification Search
CPC ............ B23Q 3/00; B23Q 3/06; B23Q 3/154
See application file for complete search history.

(56) References Cited

U.S. PATENT DOCUMENTS

| 1,373,136 | A | * | 3/1921 | Kranz | A45C 3/02 |
| | | | | | 150/100 |
| 1,627,583 | A | * | 5/1927 | Thum | A47G 23/065 |
| | | | | | 229/117.13 |
| 5,501,441 | A | * | 3/1996 | Kegley | A47J 47/005 |
| | | | | | 269/13 |
| 8,607,740 | B2 | * | 12/2013 | Webb | A01K 1/029 |
| | | | | | 119/725 |
| 2007/0267800 | A1 | * | 11/2007 | Zeng | A47J 47/005 |
| | | | | | 269/302.1 |
| 2009/0014935 | A1 | * | 1/2009 | Zeng | A47J 47/005 |
| | | | | | 269/302.1 |
| 2009/0194925 | A1 | * | 8/2009 | Rolf | A47J 47/005 |
| | | | | | 269/302.1 |

* cited by examiner

*Primary Examiner* — Lee D Wilson
(74) *Attorney, Agent, or Firm* — Thomas W. Galvani, P.C.; Thomas W. Galvani

(57) ABSTRACT

A bendable mat comprising a top surface, a bottom surface, and a circumferential edge, at least four corners, and a shaped channel located adjacent to at least two of the at least four corners. A method for using a bendable mat comprising the steps of: providing a bendable mat comprising a top surface, a bottom surface, and a circumferential edge, at least four corners, and a shaped channel located adjacent to at least two of the at least four corners, bending the bendable mat interlocking two of the shaped channels to form a funnel shape.

14 Claims, 5 Drawing Sheets

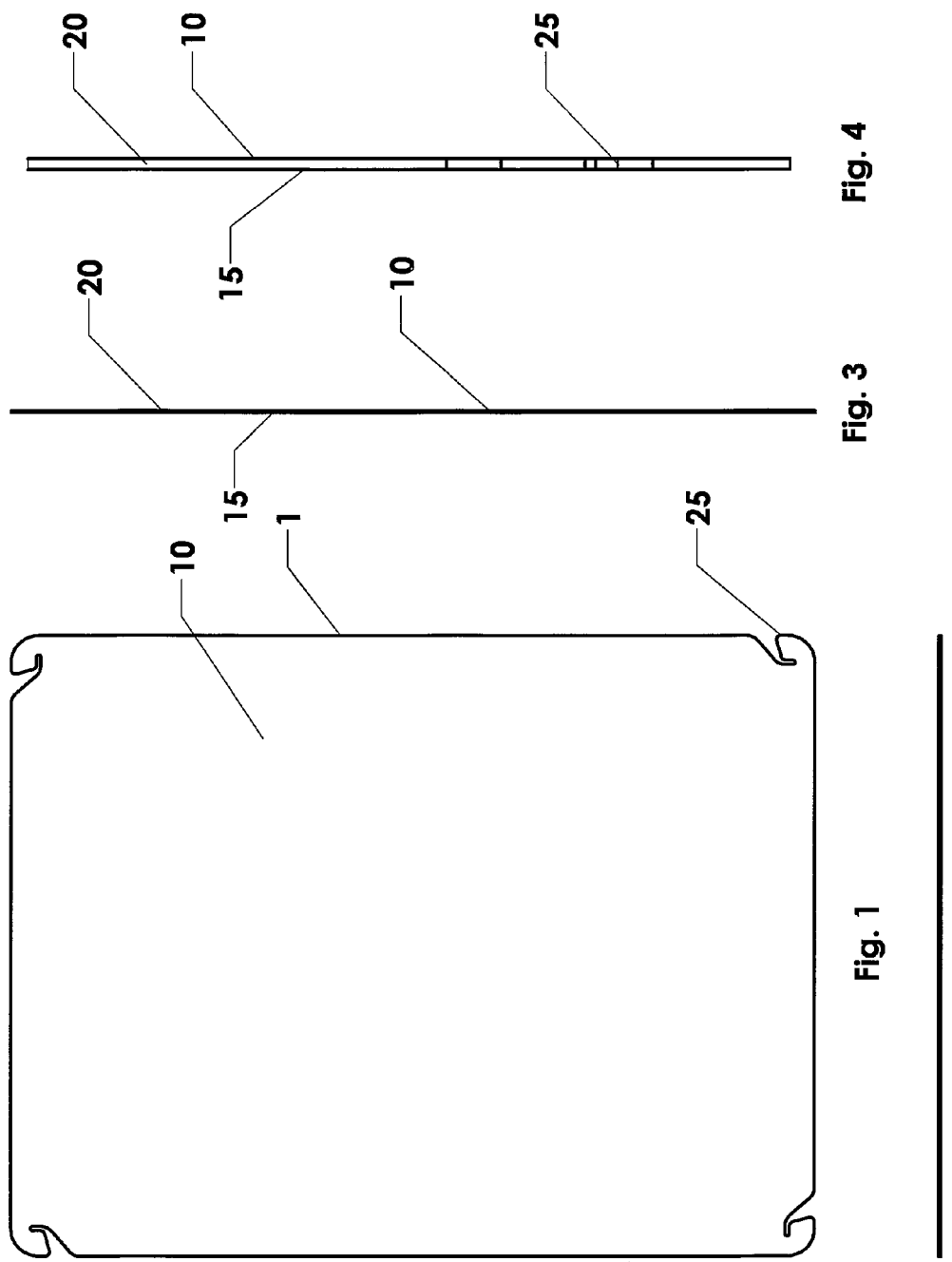

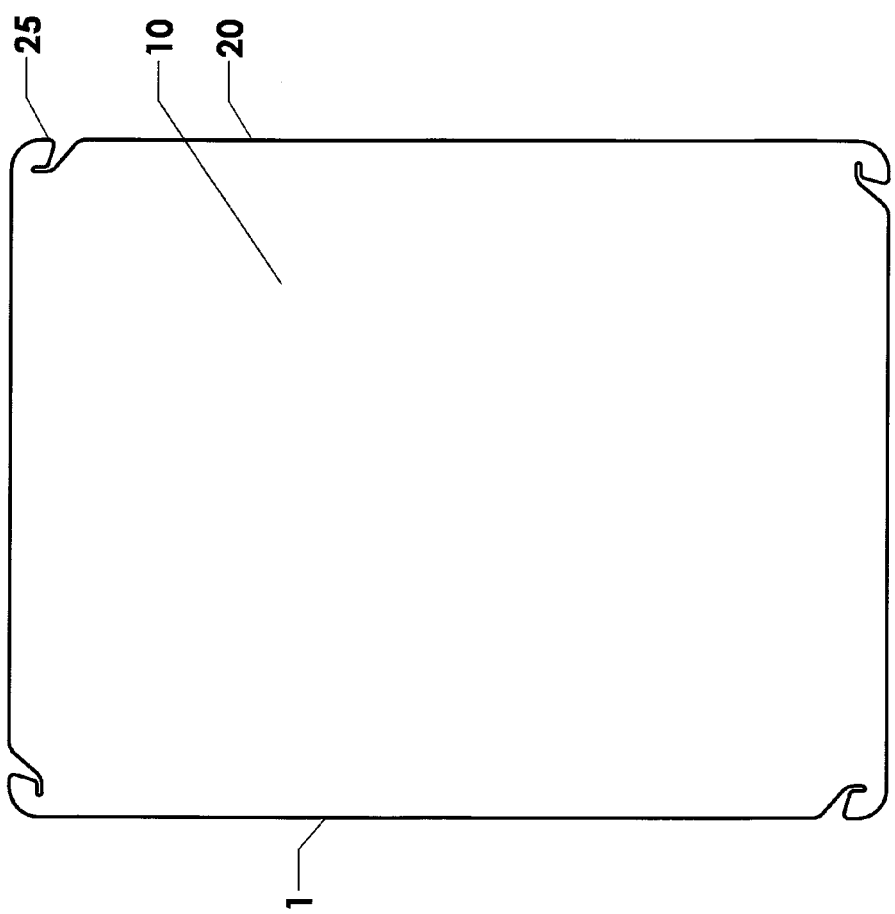

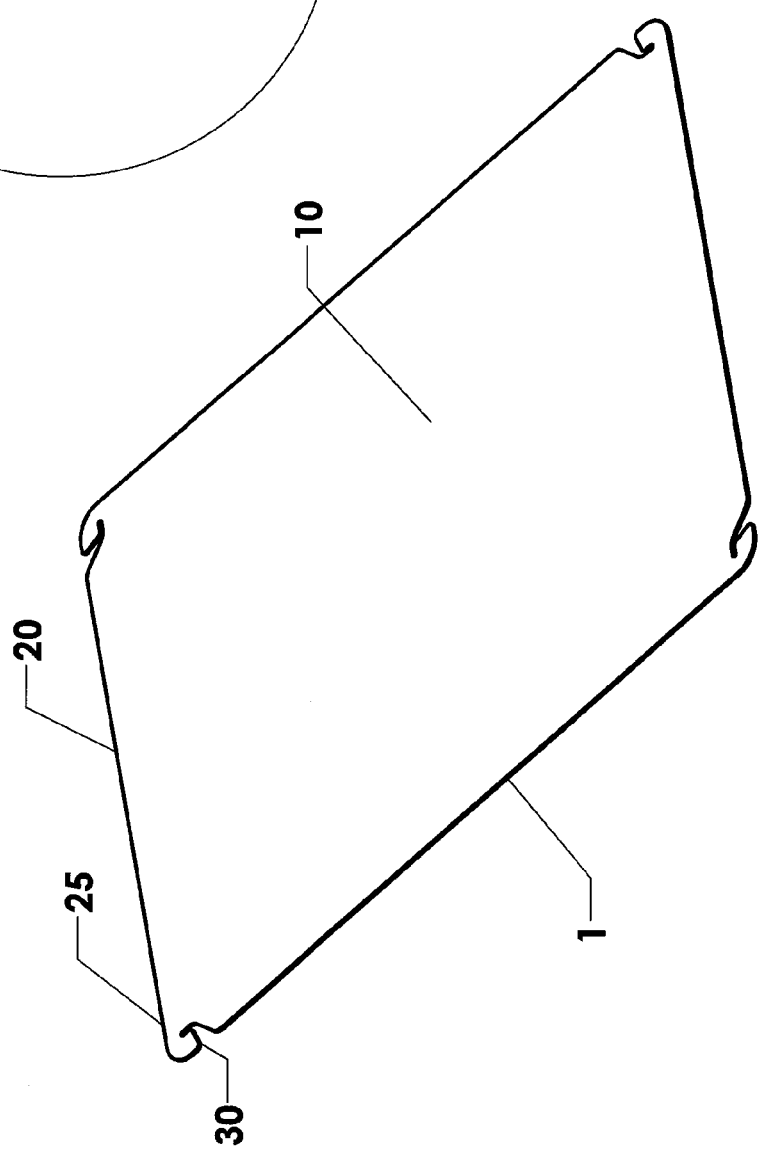

BENDABLE MAT

FIELD OF THE INVENTION

The present invention is generally in the field of cutting and scooping mats. More specifically, the present invention is a bendable mat for cutting objects or scooping small objects.

BACKGROUND

Many times there is a need for a flat surface which can then be folded to form a funnel or a scoop. Such an example is when a person chops vegetables and then wishes to place the chopped vegetables into a small bowl or dish. Lifting a flat surface can be cumbersome and may result in some of the chopped vegetables falling or rolling off the surface onto the counter or floor. Being able to fold the flat surface into a funnel would greatly aid in being able to simply pour the chopped vegetables into a bowl. Another use is when you have a container that holds many different sized screws, bolts, washers, nuts, etc. You can simply dump the hardware onto the flat surface, select the items you want, and then fold the corners to use the flat surface as a funnel to pour the remaining hardware back into the container from which they came.

Thus, there is a need for a self securing bendable mat that may be used as a cutting surface followed by a self securing funnel. Alternately the mat may be used to scoop up small items and further used as a self securing funnel.

SUMMARY OF INVENTION

It is an object of the present invention to provide a self securing bendable mat that may be used as a cutting surface followed by a self securing funnel.

It is another object of the present invention to provide a mat that may be used to scoop up small items and further used as a self securing funnel.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

BRIEF DESCRIPTION OF THE DRAWING

FIG. 1 shows the top view.
FIG. 2 shows front view.
FIG. 3 shows the right side view.
FIG. 4 shows a section view of right side.
FIG. 5 shows the back view.
FIG. 6 shows a section view of lower right side back view.
FIG. 7 shows an isometric view.
FIG. 8 shows a section view of upper right isometric view.

DETAILED DESCRIPTION OF PREFERRED EMBODIMENTS

Figure 9:
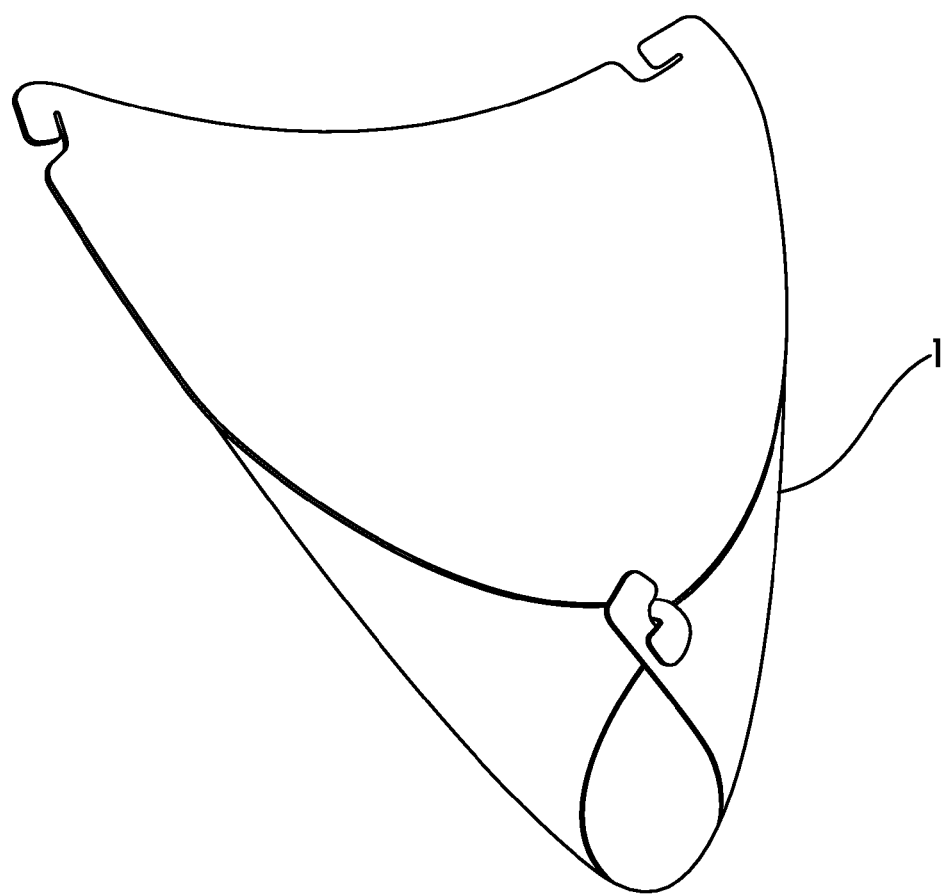
FIG. 9 shows multi-mat folded and connected on a short side.
Figure 10:
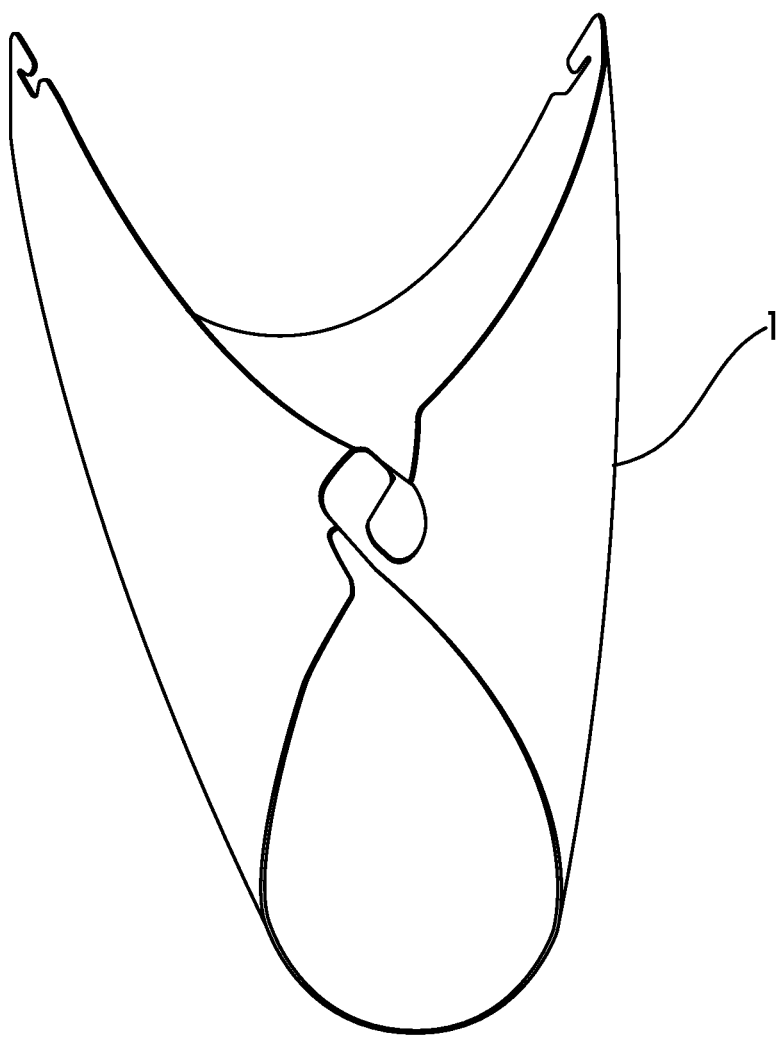
FIG. 10 shows multi-mat folded and connected on a long side.

The present invention is a bendable mat 1.

The bendable mat 1, according to the present invention, comprises a top surface 10 and a bottom surface 15. The bendable mat 15, further includes a circumferential edge 20.

It is critical to the present invention that the bendable mat 1 be made of a semi-rigid material that allows for resilient bending (i.e. has a restoring force to its original configuration).

The bendable mat 1 further comprises at least four corners 25. At least two of the at least four corners has a shaped channel 30 located adjacent to the corner 25. In a preferred embodiment, the shaped channels 30 are all identically shaped. In an alternative embodiment, the shaped channels 30 have more than one different shape.

In the preferred embodiment, each shaped channel 30 comprises generally "C" shape or "J" shape or "L" shape. This is accomplished by the critical inclusion of a leg 35 that is angled relative to the main body of the shaped channel 30 and located at the end of the shaped channel 30. This shape has been found to allow adjacent shaped channels 30 to interlock, thereby forming a funnel for easy concentration of held objects, such as cut-up items or scooped up items. In a preferred embodiment, the leg 35 is angled so that it is parallel to the closest edge of the mat 1.

In use, one takes a bendable mat 1, folds the bendable mat 1, such that adjacent shaped channels 30, interlock to form a funnel shape.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A bendable mat comprising:
   a top surface, a bottom surface, and a circumferential edge;
   at least four corners of the circumferential edge; and
   shaped channels located adjacent to the four corners;
   wherein each of the shaped channels is identical but arranged in a normal orientation to an adjacent one of the shaped channels.

2. The bendable mat according to claim 1 wherein the shaped channel is substantially "J" or "C" or "L" shaped, having at least one short leg.

3. The bendable mat according to claim 2 wherein the at least one short leg is substantially parallel to the nearest circumferential edge.

4. A method of using a bendable mat comprising the steps of:
   providing a bendable mat comprising a top surface, a bottom surface, and a circumferential edge, at least four corners of the circumferential edge, and shaped channels located adjacent to the least four corners, wherein each of the shaped channels is identical but arranged in a normal orientation to an adjacent one of the shaped channels;
   bending the bendable mat; and
   interlocking two of the shaped channels to form a funnel shape.

5. The method according to claim 4 wherein the shaped channel is substantially "J" or "C" or "L" shaped, having at least one short leg.

6. The method according to claim 5 wherein the at least one short leg is substantially parallel to the nearest circumferential edge.

7. A bendable mat comprising:
   a top surface, a bottom surface, and a circumferential edge having corners;
   a slot formed into at least two of the corners, each slot defining a free leg at the respective corner; and
   each leg is oriented to engage with another of the legs formed at an adjacent slot when the mat is folded to form a funnel shape.

8. The bendable mat of claim 6, wherein each slot is identical.

9. The bendable mat of claim 6, wherein each slot is arranged in a normal orientation to an adjacent slot.

10. The bendable mat of claim 6, wherein each leg is oriented to interlock with another of the legs.

11. The bendable mat of claim 6, wherein each slot comprises a wide opening at the circumferential edge and a narrow end inboard from the circumferential edge.

12. The bendable mat of claim 11, wherein the wide narrow end is angled with respect to the wide opening.

13. The bendable mat of claim 11, wherein the narrow end is parallel with respect to the circumferential edge.

14. The bendable mat of claim 7, wherein the channel is substantially "J" or "C" or "L" shaped.

* * * * *